(12) United States Patent  
Saito

(10) Patent No.: US 6,580,919 B1  
(45) Date of Patent: Jun. 17, 2003

(54) CDMA TRANSMISSION POWER CONTROL CAPABLE OF PREVENTING CALL DISCONNECTION AND DEGRADATION OF CAPACITY OF SUBSCRIBERS

(75) Inventor: Atsushi Saito, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/438,498

(22) Filed: Nov. 12, 1999

(30) Foreign Application Priority Data

Dec. 11, 1998 (JP) .......................... 10-322231

(51) Int. Cl.$^7$ ................................. H04B 7/00
(52) U.S. Cl. .................. 455/522; 455/552; 455/69; 455/70
(58) Field of Search ................... 455/552, 69, 70

(56) References Cited

U.S. PATENT DOCUMENTS

| | | | |
|---|---|---|---|
| 5,216,692 A | | 6/1993 | Ling |
| 5,267,262 A | * | 11/1993 | Wheatley, III ............. 340/7.33 |
| 5,386,589 A | * | 1/1995 | Kanai ......................... 455/423 |
| 5,590,409 A | * | 12/1996 | Sawahashi et al. ......... 370/342 |
| 5,629,934 A | * | 5/1997 | Ghosh et al. ............... 340/7.36 |
| 5,933,781 A | * | 8/1999 | Willenegger et al. ....... 370/342 |
| 6,101,179 A | * | 8/2000 | Soliman ...................... 370/342 |
| 6,151,508 A | * | 11/2000 | Kim et al. .................. 455/13.4 |
| 6,173,162 B1 | * | 1/2001 | Dahlman et al. ........... 455/522 |
| 6,301,485 B1 | * | 10/2001 | Lee ............................. 370/342 |
| 6,347,231 B1 | * | 2/2002 | Miya ........................... 455/522 |

FOREIGN PATENT DOCUMENTS

| | | |
|---|---|---|
| EP | 0682419 | 11/1995 |
| EP | 0717508 | 6/1996 |
| EP | 96/37972 | * 11/1996 |
| EP | 0823793 | 2/1998 |
| WO | WO 9845962 | 10/1998 |

OTHER PUBLICATIONS

Samuel C. Yang, "CDMA RF System Engineering", pp. 88–94, Artech House, May 1998.

* cited by examiner

*Primary Examiner*—Vivian Chin  
*Assistant Examiner*—Sujatha Sharma  
(74) *Attorney, Agent, or Firm*—Foley & Lardner

(57) ABSTRACT

In a base station for use in a CDMA open loop control reverse channel interference correcting system for carrying out correction of a reverse channel interference, a base receiver receives a reverse transmission signal as a reverse received signal and measures received powers of the reverse received signal to produce measured received power values. An average power calculating section calculates an average of the measured received power values to produce a calculated average value. On the basis of the calculated average value and a reference value, a correction value calculating section calculates a correction value for making a mobile station increase a current transmission power so as to become larger than a previous transmission power. A transmitting section transmits information indicative of the correction value to the mobile station.

33 Claims, 7 Drawing Sheets

CDMA TRANSMISSION POWER CONTROL CAPABLE OF PREVENTING CALL DISCONNECTION AND DEGRADATION OF CAPACITY OF SUBSCRIBERS

BACKGROUND OF THE INVENTION

This invention relates to a code division multiple access (CDMA) cellular mobile communication system comprising a base station and a mobile station and, in particular, to a reverse channel interference correction system and method, when there is an interference wave on a reverse channel in a case where a channel between the base station and the mobile station is connected, in a CDMA closed loop power control for performing a closed loop control for transmission power of the mobile station on the basis of a correction value for increasing an average received power that is generated, as a reference, an average received power in a case where there is no interference wave.

In the manner known in the art, the CDMA cellular mobile communication system carries out a transmission power control on the basis of an open loop control according to Interim Standard (IS)-95 standard of Telecommunication Industry Association/Electronic Industry Association (TIA/EIA) in a case of carrying out a start of a position registration sequence for a mobile station which moves in a cell (service area) of a base station. Inasmuch as a plurality of mobile stations use the same frequency band in the CDMA cellular mobile communication system, it is necessary to increase the number of multiple-mobile stations by decreasing interference power between the mobile station mutually.

As a result, control to an appropriate transmission power value is carried out in the CDMA cellular mobile communication system. In this case, the "appropriate transmission power value" is a minimum transmission power value where a data error rate is not over an allowable value when the base station receives a signal from the mobile station.

Attention will be directed to the transmission power control of the mobile station according to the open loop control on starting of channel connection between the base station and the mobile station. In the manner which later become clear, in a conventional CDMA cellular mobile communication system, the transmission power control of the mobile station according to the open loop control is defined by IS-95-A standard and compensation of the interference on a forward channel is carried out according to IS-95-B standard.

However, in the conventional CDMA cellular mobile communication system, it is difficult to obtain a received bit energy-to-interference ratio Eb/I0 (which is a ratio of desired received wave power (Eb) to interference wave power (I0) per one bit) when a lot of mobile stations communicate with the base station. In this event, its incomplete transmission power control becomes an issue. That is, due to degradation of the received bit energy-to-interference ratio Eb/I0 (degradation of channel quality when there is the interference wave on the reverse channel) in the base station, it is impossible to maintain its stable channel quality. Accordingly, it is difficult to carry out the channel connection stably and certainly and it has contributed to deterioration in its system connectivity.

As a prior art related to the open loop control of the type, Japanese Unexamined Patent Publication of Tokkai No. Hei 10-56,421 or JP-A 10-56421 is known that provides "CDMA RADIO TRANSMISSION SYSTEM, TRANSMISSION POWER CONTROLLER USED FOR THE SYSTEM AND TRANSMISSION POWER CONTROL MEASUREMENT EQUIPMENT." JP-A 10-56421 realizes adaptive control of transmission power of a mobile station in response to traffic fluctuation in terms of open loop control by correcting a control error in the open loop control for transmission power control in the code division multiple access (CDMA) radio system. According to JP-A 10-56421, a transmission power controller mounted on a mobile station is provided with a calculating circuit for calculating a desired wave reception power from a received signal, a memory circuit for storing an initial relation between the received power and a transmission power setting value, a correcting circuit for correcting the relation, and a decision circuit for deciding the transmission power set value. In this case, the transmission power controller uses a control signal included in periodically in the received signal to use the relation thereby deciding a transmission power set value from the received power while correcting the relation between the received power and the transmission power set value.

In other words, the open loop control according to JP-A 10-56421 comprises the steps of measuring an average received power or the like of the desired wave from the received signal, of detecting an error between an average received power value and a target value, and of correcting the error. In addition, the transmission power control according to JP-A 10-56421 adaptively controls the transmission power of the mobile station in accordance with an amount of traffic.

In JP-A 10-56421, it is possible to carry out correction of the open loop control on the basis of the error between the target value and the average received power value of the desired wave that is measured from the received signal in the open loop control. However, JP-A 10-56421 may be disadvantageous in that it is complicated in structure because correction of the error between the target value and the average received power value is carried out using a table.

In addition, various other CDMA mobile communication systems related to the present invention are already known. By way of example, Japanese Unexamined Patent Publication of Tokkai No. Hei 5-75,484 or JP-A 5-75484 discloses a transmission power controller which is capable of controlling transmission power at a high speed to reduce interference onto another station and to reduce power consumption. According to JP-A 5-75484, the fluctuation of a reception level is detected by a reception level fluctuation detection section. When number of times of the reception level reaching a level or below within a prescribed time exceeds a reference value, a discrimination section controls switches to calculate P1=P2−(V2−Vt) at a transmission power calculation section, where P2 is a transmission power of an opposite station obtained from a demodulation output of the received signal, V2 is a reception level from a detection section and Vt is a required minimum reception level. A modulation section is modulated by a signal representing the P1 to control a power amplifier so that the transmission power is P1. The opposite station is controlled similarly and the transmission power is controlled corresponding to the reception level fluctuation at a high speed by the open loop control. When the reception level fluctuation is less than the reference value, the switches are controlled, a received addition/subtraction request value α and a preceding transmission power P1' are added as P1=P1'+α, and amplifier is controlled so that the transmission power is equal to the P1. β=Vt−V2 is calculated by an adder section and the value is used as an adder/subtractor request value and the modulation section is controlled for the purpose of modulation transmission.

Japanese Unexamined Patent Publication of Tokkai No. Hei 9-199,963 or JP-A 9-199963 provides a transmission power control circuit which conducts open loop transmission power control and closed loop transmission power control with high accuracy. According to JP-A 9-199963, provided with a first variable gain control amplifier for varying a gain of an input signal with a control voltage, a transmission power control circuit is provided with a second variable gain control amplifier for varying a gain of an output of the first variable gain control amplifier and an automatic power control circuit for generating a control voltage to control the gain of the second variable gain control amplifier from a distributed transmission output. The automatic power control circuit is provided with at least a comparator circuit for outputting a difference between a transmission output and a reference value, a sample-and-hold circuit for sampling and holding the output of the comparator circuit. The sample-and-hold circuit is selected to be a sampling state or a holding state in response to the transmission state to apply on/off control for the automatic power control circuit. The automatic power control circuit is set when the open loop transmission power control is in use and the automatic power control circuit is cleared when the closed loop power control is in use.

Japanese Unexamined Patent Publication of Tokkai No. Hei 8-32,514 or JP-A 8-32514 discloses a transmission power control method and a transmission power controller which is capable of reducing the effect on other mobile stations by selecting an open loop control to set transmission power of a mobile station in response to a change in a desired reception power of a mobile station when the received signal power of the mobile station is suddenly increased to reduce the transmission power of the mobile station in a short time. According to JP-A 8-32514, a mobile station measures an average desired wave received signal power per one transmission power control period from a base station and calculates an average power of a desired wave received signal in the unit of the transmission power control period and in the unit of transmission power control of one preceding time or over. When a desired wave received average power difference exceeds a reference power difference, it is interpreted that the mobile station appears at a location seen through from a shadow of a building (shadowing state). In this case, the desired wave received signal power in the base station is rapidly increased. On the other hand, the interference power from other mobile station is not so much increased. Instead, interference is imposed upon other mobile station. Then the intensity of the signal send from the base station is measured by the mobile station by open loop control and the received signal is high, then the power of the signal sent to the base station is reduced.

SUMMARY OF THE INVENTION

It is therefore an object of the present invention to provide a CDMA transmission power control method and system which are capable of gently carrying out transmission power control for a mobile station on starting of call connection.

It is another object of the present invention to provide a CDMA transmission power control method and system of the type described, in which impossibility of a closed loop control never occurs when transmission power is decreased too.

It is still another object of the present invention to provide a CDMA transmission power control method and system of the type described, in which the transmission power in the mobile station does not overshoot.

It is yet another object of the present invention to provide a CDMA transmission power control method and system of the type described, in which other mobile stations are not subjected to instantaneous large interference.

It is a further object of the present invention to provide a CDMA transmission power control method and system of the type described, which is capable of preventing call disconnection and degradation of capacity of subscribers.

Other objects of this invention will become clear as the description proceeds.

According to an aspect of this invention, a method is for correcting a reverse channel interference in a code division multiple access (CDMA) open loop control for carrying out correction of the reverse channel interference on the basis of a received power of an interference wave in a case where a base station performs an open loop control of a transmission power for a mobile station. In the above-mentioned method, the base station comprises the steps of measuring received powers of a reverse received signal that correspond to states of the interference wave on a reverse channel to produce measured received power values indicative of the received powers of the reverse received signal, of calculating an average of the measured received power values to produce a calculated average value indicative of the average of the measured received power values, of calculating, on the basis of the calculated average value and a reference value, a correction value for making the mobile station increase a current transmission power so as to become larger than a previous transmission power, and of transmitting information indicative of the correction value from the base station to the mobile station. The mobile station comprises the steps of receiving the information indicative of the correction value, of determining whether or not the correction value is renewed, and of setting transmission power of the mobile station on the basis of the correction value when the correction value is renewed.

DESCRIPTION OF THE PREFERRED EMBODIMENT

The description will first proceed to transmission power control in a mobile station according to an open loop control on starting of channel connection between a base station and the mobile station in order to facilitate an understanding of the present invention.

The IS-95-A standard in TIA/EIA defines the transmission power control of the mobile station according to the open loop control that is represented by expression (1) as follows:

[average transmission power]=–[average received power]–73 dB+NOM·PWR+INIT·PWR    (1)

where +NOM·PWR represents a default value or bits stored in a transmission power setting field of a speech channel and +INIT· Both of+NOM·PWR and +INIT·PWR are stored in an access parameter message that the base station transmits at a paging channel. When the mobile station receives the access parameter message, the mobile station rewrites a value of a register provided therein to a power value that the base station transmits. In addition, the above-mentioned average received power represents a received electric field strength that the mobile station receives but does not represent a received electric field strength of a pilot signal alone from a particular base station.

Accordingly, when a forward propagation loss decreases as the open loop control, the average received power increases in a particular mobile station. As a result, the particular mobile station sets the transmission power so as to decrease the transmission power. In this case, inasmuch as the propagation loss is small, the base station can receive a transmission signal from the particular mobile station. On the contrary, when the propagation loss is large, the average received power decreases in the particular mobile station. As a result, the particular mobile station sets the transmission power so as to increase the transmission power. Accordingly, although the propagation loss becomes large, the base station can receive the transmission signal from the particular mobile station.

Under the circumstances, it will be assumed that a plurality of other mobile stations simultaneously carry out communication with the base station in the same cell (service area). In this event, the transmission power in the base station increases and the average received power in the particular mobile station increases with an increase of the transmission power in the base station. Accordingly, the particular mobile station reduces the transmission power thereof. As a result, the base station may not receive the transmission signal from the particular mobile station.

Figure 1:
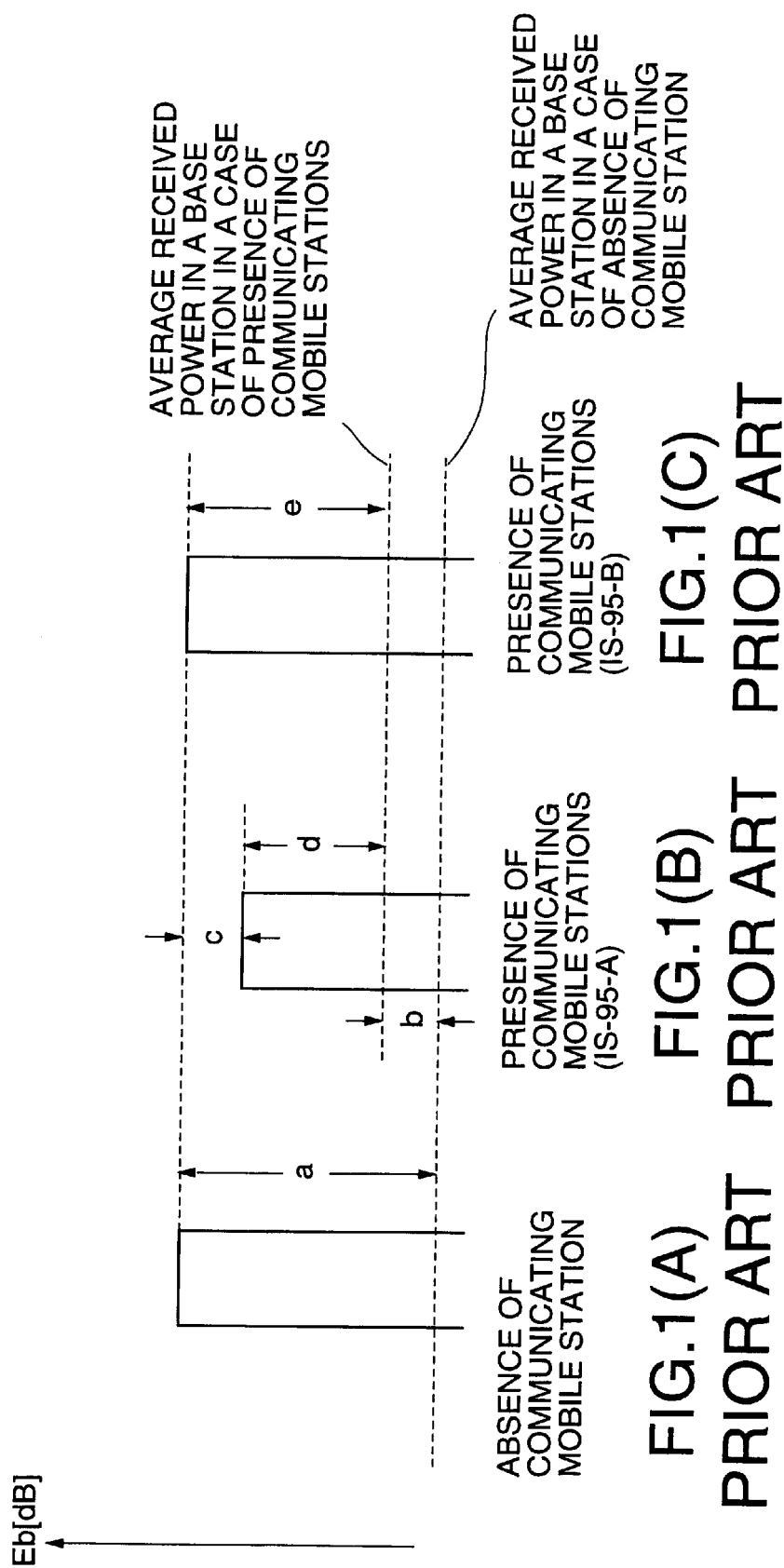
FIGS. 1(A), 1(B), and 1(C) are views for use in describing cases where a base station cannot receive a reverse transmission signal on decreasing of transmission power in a mobile station.

FIGS. 1(A), 1(B), and 1(C) show desired received wave powers for use in describing in a case where the base station cannot receive the transmission signal from the particular mobile station when the transmission power of the mobile station reduces.

FIG. 1(A) shows a desired received wave power (Eb) in a case where there is no other communicating mobile station in the same cell at which the particular mobile station communicates with the base station. In this event, when the transmission power control according to the open loop control is carried out in the particular mobile station, a received bit energy-to-interference ratio Eb/I0 of a desired wave from the particular mobile station is illustrated in FIG. 1(A) and is represented by expression (2) as follows:

$Eb/I0=a$ (dB)    (2)

FIG. 1(B) shows a desired received wave power (Eb) of a case where there are other communicating mobile stations in the same cell at which the particular mobile station communicates with the base station. In this event, inasmuch as the base station carries out transmission using not only a pilot channel, a page channel, and a synchronization channel but also a traffic channel for the other communicating mobile stations, the total transmission power increases. With an increase of the total transmission power, the average received power of the particular mobile station increases too. As a result, the transmission power of the particular mobile station decreases by a received wave power c which corresponds to the increase of the total transmission power and which is illustrated in c of FIG. 1(B).

In addition, the base station receives reverse signals on a reverse channel from a plurality of mobile stations. Accordingly, the interference wave power (I0) in the base station increases by a wave power b, which is illustrated in b of FIG. 1(B), in comparison with a case where there is no other communicating mobile station in the same cell. As described above, when the transmission power control according to the open loop control is performed by the particular mobile station, a received bit energy-to-interference ratio Eb/I0 of a desired wave from the particular mobile station is illustrated in d of FIG. 1(B) and is represented by expression (3) as follows:

$Eb/I0=d=a-b-c$ (dB)    (3)

Now, the description will proceed to an interference compensation of the forward channel that is performed in accordance with IS-95-B standard in TIA/EIA. According to IS-95-B standard in TIA/EIA, transmission power control according to the open loop control is performed in accordance with expression (4) as follows:

[average transmission power]=–[average received power]–73 dB+ [interference correction value]+NOM·PWR–(16× NOM·PWR·EXT)+INIT·PWR    (4)

where NOM·PWR·EXT represents bits stored in a small transmission power indicating field in the base station and the interference correction value is represented by expression (5) as follows:

[interference correction value]=min(max(–7–ECIO,0),7)    (5)

where ECIO represents a received chip energy-to-interference ratio Ec/I0 (which is a ratio of desired received wave power (Ec) to interference wave power (I0) per one chip) of an active set pilot signal that is represented using a unit of dB.

Figure 2:
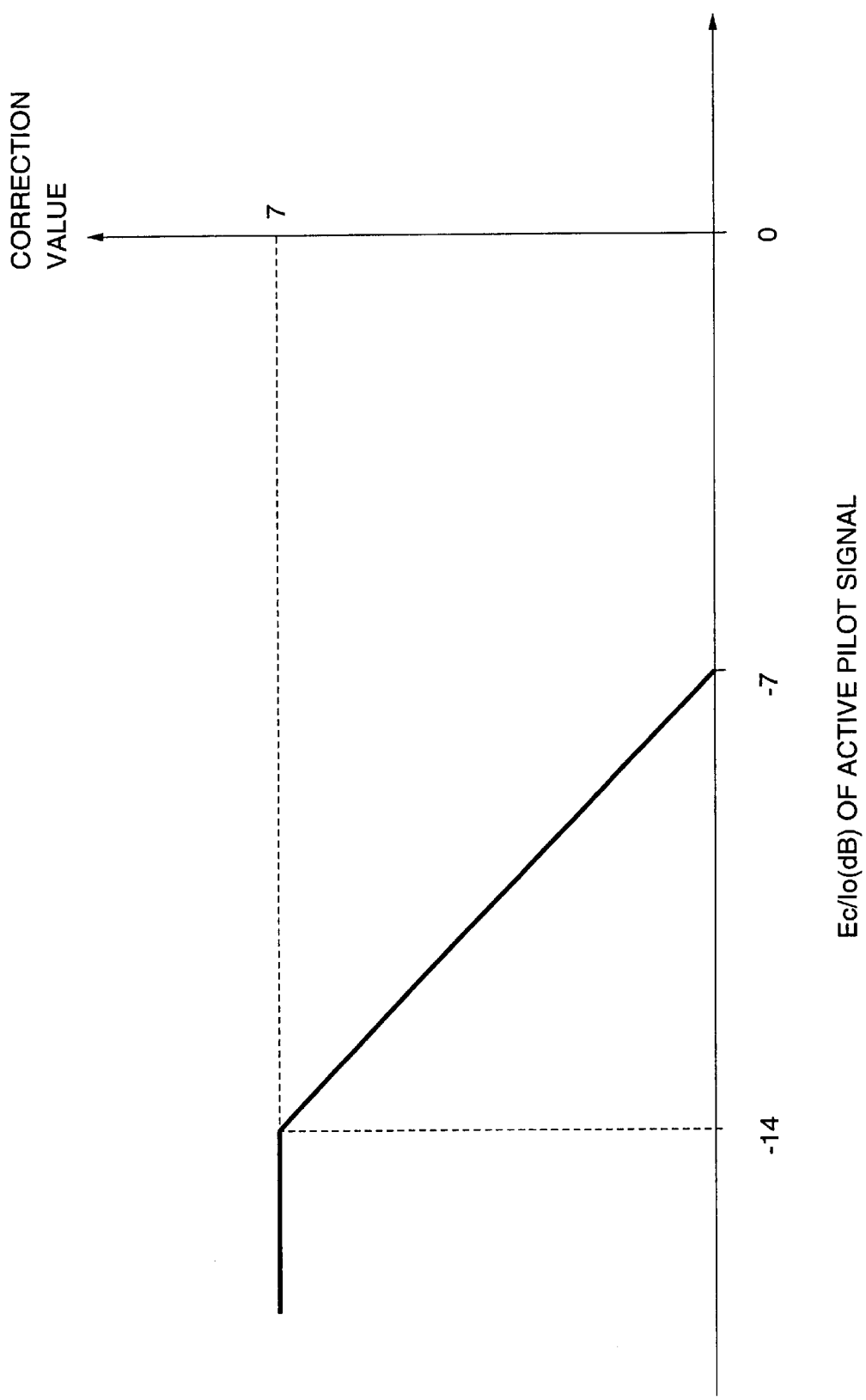
FIG. 2 is a view for use in describing an interference correction value according to IS-95-B standard.

FIG. 2 is a view for use in describing the interference correction value according to IS-95-B standard. The interference correction value according to IS-95-B standard increases by one dB whenever the received chip energy-to-interference ratio Ec/I0 decreases by one dB in an area where the received chip energy-to-interference ratio Ec/I0 lies between –7 dB at which correction is started and –14 dB, as illustrated in FIG. 2.

In a case where a lot of mobile stations carry out communication in the same cell, the particular mobile station receives not only the pilot signal from the base station but also transmission signals from other mobile stations on communication channels. As a result, the average received power in the particular mobile station becomes large. In this event, inasmuch as received power of the desired wave does not change and received power of the interference wave becomes large, the received chip energy-to-interference ratio Ec/I0 becomes small. When the received chip energy-to-interference ratio Ec/I0 becomes small, the interference correction value becomes large and control for making the transmission power reduce is not carried out. Accordingly, the received energy in the base station does not change.

However, in a case where a plurality of mobile stations carry out communication, a level of the interference wave rises. In this event, a received bit energy-to-interference ratio Eb/I0 of a desired wave from the particular mobile station is illustrated in e of FIG. 1(C) and is represented by expression (6) as follows:

$$Eb/I0 = e = a - b \text{ (dB)} \tag{6}$$

Accordingly, when the wave power b is large, namely, when the number of communicating mobile stations is much, it occurs a case where the received bit energy-to-interference ratio Eb/I0 required for reception is obtained.

As described above, it is difficult to obtain a necessary received bit energy-to-interference ratio Eb/I0 when a lot of mobile stations communicate with the base station. In this event, its incomplete transmission power control becomes an issue. That is, due to degradation of the received bit energy-to-interference radio Eb/I0 (degradation of channel quality when there is the interference wave on the reverse channel) in the base station, it is impossible to maintain its stable channel quality. Accordingly, it is difficult to carry out the channel connection stably and certainly and it has contributed to deterioration in its system connectivity, as mentioned in the preamble of the instant specification.

Now, the description will proceed to a reverse channel interference correction method in a code division multiple access (CDMA) open loop control according to a preferred embodiment of this invention.

Figure 3:
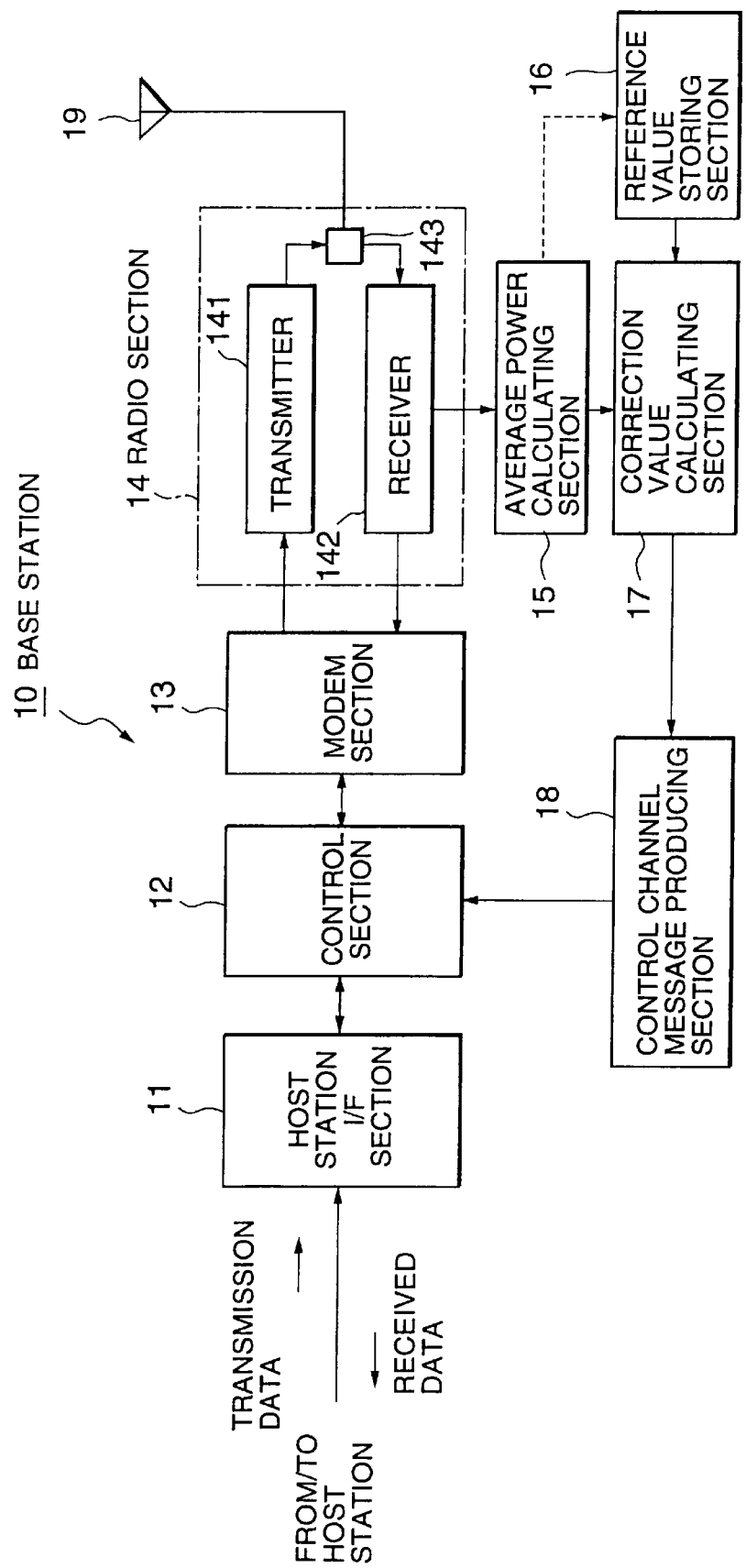
FIG. 3 is a block diagram of a base station for use in a reverse channel interference correcting system in a code division multiple access (CDMA) open loop control according to an embodiment of this invention.
Figure 4:
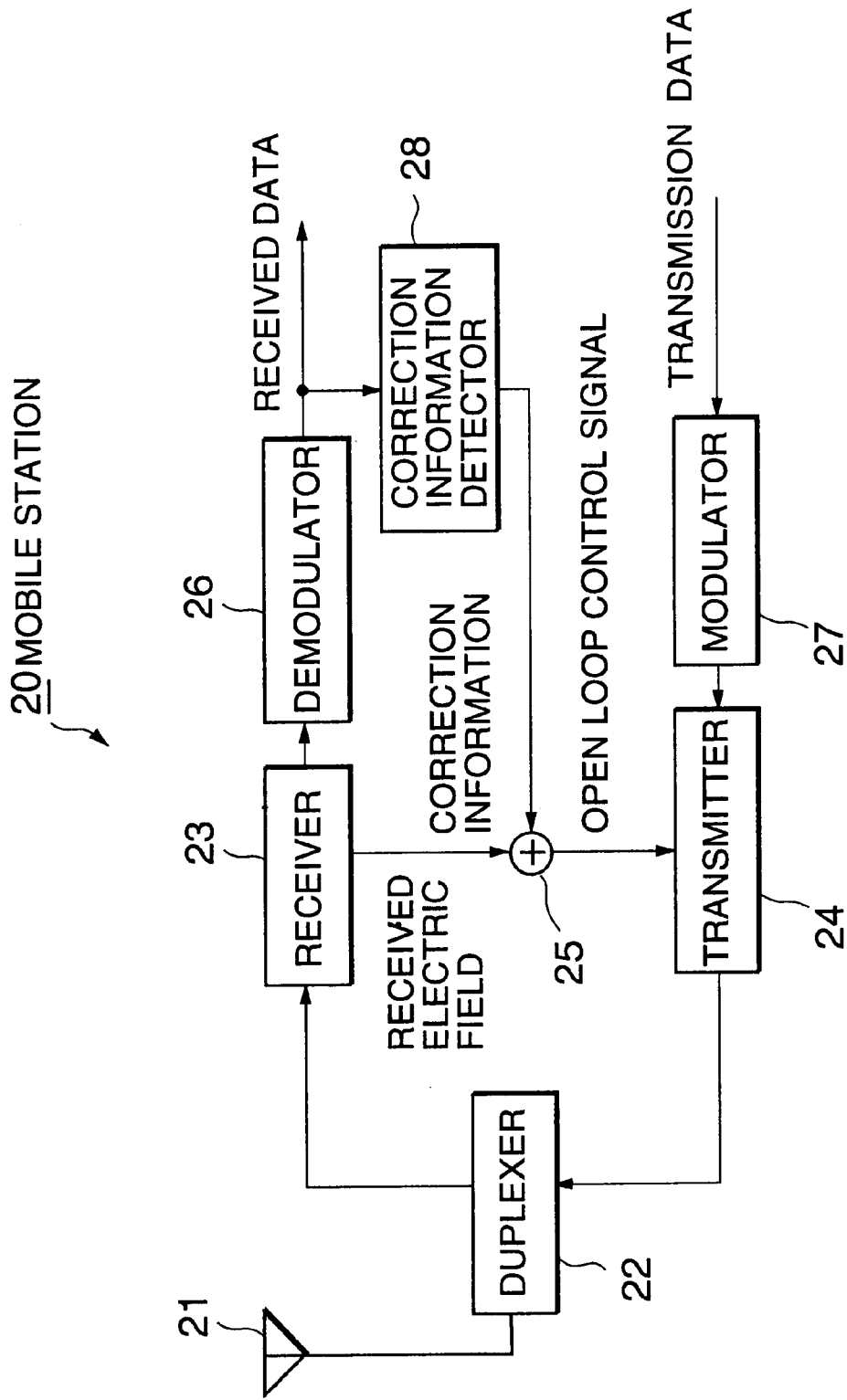
FIG. 4 is a block diagram of a mobile station for use in the reverse channel interference correcting system in the CDMA open loop control according to an embodiment of this invention.

FIG. 3 is a block diagram of a base station 10 for realizing the reverse channel interference correction method in the CDMA open loop control while FIG. 4 is a block diagram of a mobile station 20 for realizing the reverse channel interference correction method in the CDMA open loop control.

As shown in FIG. 3, the base station 10 comprises a host station interface (I/F) section 11, a control section 12, a modem (modulator/demodulator) section 13, a radio section 14, an average power calculating section 15, a reference value storing section 16, a correction value calculating section 17, a control channel message producing section 18, and a base transmit-receive shared antenna 19.

The host station interface section 11 is connected to a host station (not shown) and carries out exchange of transmission data and received data between the host station and the base station 10. The host station interface section 11 is connected to the control section 12. The control section 12 performs control related to transmission and reception of spread spectrum and, in particular, performs the CDMA open loop control according to the embodiment of this invention in the manner which will later become clear.

The modem section 13 is connected between the control section 12 and the radio section 14. On reception, the modem section 13 detects a correlated signal supplied from the radio section 14 and carries out error correcting processing on a detected correlated signal to produce decoded data. In addition, the modem section 13 is supplied with transmission data from the control section 12. The modem section 13 spreads a spectrum of the transmission data using a spreading code assigned to the mobile station 20 (FIG. 4) to produce a spread signal. The modem section 13 supplies the radio section 14 with the spread signal and a transmission power control information signal which corresponds to an access parameter message.

Connected to the modem section 13, the radio section 14 comprises a base transmitter 141, a base receiver 142, and a base duplexer 143. The base transmitter 141 is connected between the modem section 13 and the base duplexer 143 while the base receiver 142 is connected between the modem section 13 and the base duplexer 143. The base duplexer 143 is connected to the base transmit-receive shared antenna 19. The base transmitter 142 power-amplifies the spread signal from the modem section 13 to transmits a power-amplified spread signal via the base duplexer 143 and the base transmit-receive shared antenna 19 as a forward transmission signal. The base receiver 142 is supplied with a reverse transmission signal from the mobile station 20 (FIG. 4) through the base transmit-receive shared antenna 19 and the base duplexer 143 as a reverse received signal. The base receiver 142 carries out an automatic gain control (AGC) on the reverse received signal. In addition, the base receiver 142 successively produces received power values of the reverse received signal. The base transmit-receive shared antenna 19 is for carrying out transmission and reception of spread spectrum waves having the same frequency band.

The average power calculating section 15 is connected to the base receiver 142 and the average power storing section 16. The average power calculating section 15 is successively supplied with the received power values from the base receiver 142. The average power calculating section 15 averages the received power values at predetermined time durations to successively produce average received power values. It will be presumed that there is no communicating mobile station and/or there is no other interference wave on the reverse channel. Under the circumstances, the average power calculating section 15 calculates an average value of the received power values for the predetermined time duration to make the reference value storing section 16 store a calculated average value therein as a reference value.

The correction value calculating section 17 is connected to the average power calculating section 15 and the reference value storing section 16. The correction value calculating section 17 is supplied with a current received power value and the reference value from the average power calculating section 15 and the reference value storing section 16, respectively. The correction value calculating section 17 calculates a current correction value on the basis of the current received power value and the reference value to produce the current correction value.

The control channel message producing section 18 is connected to the correction value calculating section 17. The control channel message producing section 18 is supplied with the current correction value from the correction value calculating section 17. In addition, the control channel message producing section 18 has, as station data of the base station 10, an access parameter message which comprises an initial power setting field INIT·PWR, a transmission power setting field NOM·PWR each of which for storing a default value and a parameter alteration field ACC·MES·SEQ. The control channel message producing section 18 adds the current correction value to the default value of the initial power setting field INIT·PWR or the transmission power setting field NOM·PWR to produce an added value. That is, the control channel message producing section 18 writes the added value in either the initial power setting field INIT·PWR or the transmission power setting field NOM·PWR of the access parameter message. Furthermore, the control channel message producing section 18 renews a value or bits stored in the parameter alteration field ACC·MES·SEQ of the access parameter message. The control channel message producing section 18 supplies the access parameter message to the control section 12.

Now, the description will proceed to brief operation of the base station 10 illustrated in FIG. 3.

In FIG. 3, the host station interface section 11 exchanges the transmission data and the received data between the host station (not shown) and the base station 10. The control section 12 receives the transmission data from the host station interface section 11 and transmits the received data to the host station interface section 11. The control section 12 performs the open loop control by controlling the radio section 14, the average power calculating section 15, the reference value storing section 16, the correction value calculating section 17, the control channel message producing section 18, and the modem section 13 as follows:

The base receiver 142 successively measures instantaneous received power values of the reverse received signal (or a state of the interference wave of the reverse channel) as measured received power values;

The average power calculating section 15 calculates the current average received power value of the measured received power values;

The correction value calculating section 17 calculates, using the current average received power value and the reference value stored in the reference value storing section 16, the correction value for making the mobile station 20 (FIG. 4) increase current transmission power in comparison with previous transmission power;

The control channel message producing section 18 adds the correction value to the default value (bits) of the initial power setting field INIT·PWR or the transmission power setting field NOM·PWR in the access parameter message on the control channel to obtain a renewed value; and The control channel message producing section 18 renews the value (bits) of the parameter alteration field ACC·MES·SEQ of the access parameter message and the control section 12 transmits the access parameter message via the modem section 13, the base transmitter 141, the base duplexer 143, and the base transmit-receive shared antenna 19 to the mobile station 20 (FIG. 4).

In FIG. 3, the modem section 13 detects the correlated signal from the base receiver 142 on reception and carries out the error correcting processing on the correlated signal to produce the decoded data. In addition, supplied with the transmission data from the control section 12, the modem 13 spreads a spectrum of the transmission data using the spreading code to obtain the spread signal. The modem section 13 supplies the base transmitter 141 of the radio section 14 with the spread signal and the transmission power control information signal (corresponding to the access parameter message) for the open loop control. Supplied with the measured received power values from the base receiver 142 in the radio section 14, the average power calculating section 15 averages the measured received power values for the predetermined time duration to produce the current average received power value.

In this event, if there is no communicating mobile station and/or there is no other interference wave on the reverse channel, the average power calculating section 15 stores the current average received power value in the reference power value storing section 16 as the reference value.

Supplied with the current average received power value and the reference power value from the average power calculating section 15 and the reference value storing section 16, respectively, the correction value calculating section 17 calculates the correction value on the basis of the current average received power value and the reference power value to supply the correction value to the control channel message producing section 18. Supplied with the correction value from the correction value calculating section 17, the control channel message producing section 18 adds the correction value to the default value stored in either the initial power setting field INIT·PWR or the transmission power setting field NOM·PWR where the base station 10 has as the station data to obtain the added value. That is, the control channel message producing section 18 renews the default value stored in either the initial power setting field INIT·PWR or the transmission power setting field NOM·PWR of the access parameter message into the renewed value by adding the correction value to the default value. Furthermore, the control channel message producing section 18 renews the value (a bit) stored in the parameter alteration field ACC·MES·SEQ of the access parameter message. The access parameter message where the values or bits are renewed is supplied to the control section 12. The control section 12 transmits the access parameter message to the mobile station 20 (FIG. 4) through the modem section 13, the base transmitter 141, the base duplexer 143, and the base transmit-receive shared antenna 19.

In the radio section 14, the base transmitter 141 is supplied with the spread signal from the modem section 13. The base transmitter 141 power-amplifies the spread signal into the power-amplified signal which is transmitted through the base duplexer 143 and the base transmit-receive shared antenna 19. In addition, the base receiver 142 receives the reverse transmission signal through the base transmit-receive shared antenna 19 and the base duplexer 143 as the reverse received signal. The base receiver 142 carries out the automatic gain control (AGC) on the reverse received signal and produce the instantaneous received power values.

Turning to FIG. 4, the description will proceed to the mobile station 20. The illustrated mobile station 20 comprises a mobile transmit-receive shared antenna 21, a mobile duplexer 22, a mobile receiver 23, a mobile transmitter 24, an adder 25, a mobile demodulator 26, a mobile modulator 27, and a correction information detector 28.

Transmitted from the base station 10 (FIG. 3), the forward transmission signal is received through the mobile transmit-receive shared antenna 21 and the mobile duplexer 22 in the mobile receiver 23 as a forward received signal. The mobile receiver 23 carries out an automatic gain control (AGC) on the forward received signal. In addition, the mobile receiver 23 detects a received electric field strength in the forward received signal to produce a received electric field signal indicative of the received electric field strength. The received electric field signal is supplied to the adder 25. Supplied with the forward received signal from the mobile receiver 23, the demodulator 26 demodulates the forward received signal into forward demodulated data. In other words, the demodulator 26 despreads the forward received signal using the spreading code assigned to the mobile station 20 to produce the forward demodulated data as forward received data.

The forward received data are supplied to the correction information detector 28. As described above, the forward received data include the correction information signal indicative of the correction value. The correction information detector 28 detects the correction information signal in the forward received data. The correction information signal is supplied from the correction information detector 28 to the adder 25. The adder 25 adds the correction information signal to the received electric field signal to produce an open loop control signal. The open loop control signal is supplied to the mobile transmitter 24.

The mobile modulator 27 is supplied with reverse transmission data. The mobile modulator 27 modulates a carrier signal with the reverse transmission data into a reverse modulated signal. In other words, the mobile modulator 27 spreads a spectrum of the reverse transmission data using a reverse spreading code assigned with the base station 10

(FIG. 3) to produce a reverse spread signal as the reverse modulated signal. The reverse spread signal is supplied to the mobile transmitter 24. The mobile transmitter 24 power-amplifies the reverse spread signal with transmission power of the reverse spread signal controlled by the open loop control signal. The mobile transmitter 24 transmits a reverse power-amplified spread signal through the mobile duplexer 22 and the mobile transmit-receive shared antenna 21 as the reverse transmission signal.

Figure 5:
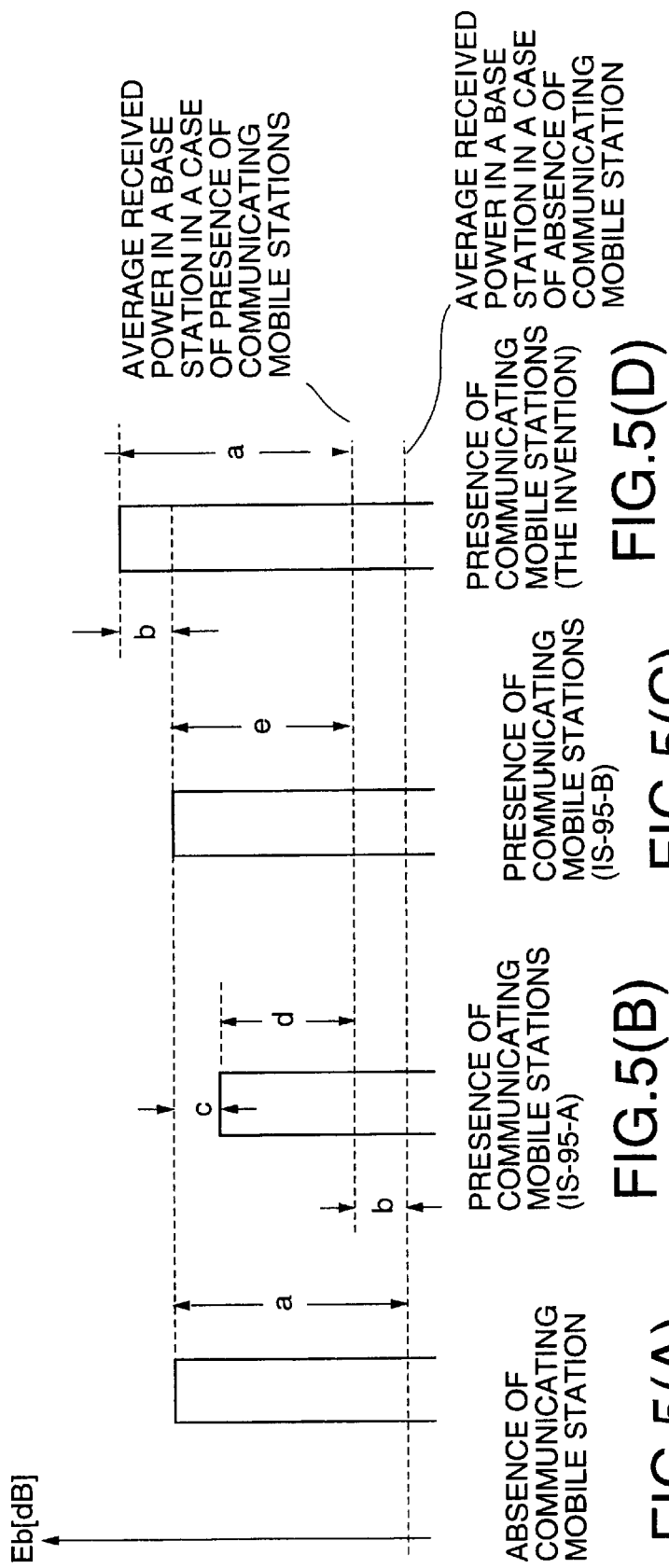
FIGS. 5(A), 5(B), 5(C), and 5(D) show desired received wave powers (Eb) per one bit according to respective methods.

Referring to FIGS. 5(A), 5(B), 5(C), and 5(D), the description will proceed to the open loop control according to the embodiment of this invention. FIGS. 5(A) through 5(C) correspond to FIGS. 1(A) through 1(C), respectively. That is, FIG. 5(A) shows a desired received wave power (Eb) in a case where there is no other communicating mobile station in the same cell at which the particular mobile station communicates with the base station. FIG. 5(B) shows a desired received wave power (Eb) of a case where there are other communicating mobile stations in the same cell at which the particular mobile station communicates with the base station under the control of IS-95-A standard of TIA/EIA. FIG. 5(C) shows a desired received wave power (Eb) of a case where there are other communicating mobile stations in the same cell at which the particular mobile station communicates with the base station under the control of IS-95-B standard of TIA/EIA. In addition, FIG. 5(D) shows a desired received wave power (Eb) of a case where there are other communicating mobile stations in the same cell at which the particular mobile station communicates with the base station under the control of the embodiment of this invention.

In FIG. 5(D), in order to prevent degradation of the received bit energy-to-interference ratio Eb/I0 (that corresponds to degradation of the channel quality) under the influence of the interference waves from the other mobile stations, the base station 10 measures an ascending portion of the average received power in comparison with a case where there is no other communicating mobile station in the same cell. In addition, the base station 10 transmits, to the mobile station 20, the transmission power control information signal (which corresponds to the access parameter message) indicative of the correction value corresponding to its measured information. The mobile station increase the transmission power in accordance with the correction value indicated by the transmission power control information. In this event, a received bit energy-to-interference ratio Eb/I0 of a desired wave from the particular mobile station is illustrated in e of FIG. 5(D) and is represented by expression (7) as follows:

$$Eb/I0 = a - b + b = a \text{ (dB)} \tag{7}$$

Referring to FIGS. 3 and 4, the description will proceed to the open loop control according the embodiment of this invention in detail.

The base receiver 142 measures the reverse received power of the reverse received signal supplied from the base transmit-receive shared antenna 19 through the base duplexer 143 to produce the instantaneous reverse received power values indicative of the reverse received power continuously or periodically. The average power calculating section 15 averages the instantaneous reverse received power values for the predetermined time duration to produce the current average reverse received power value. If there is no other communicating mobile station and/or there is no other interference wave on the reverse channel, the average power calculating section 15 stores the current average reverse received power value in the reference value storing section 16 as the reference value. The correction value calculating section 17 calculates the correction value in the transmission power control information signal on the basis of the current average reverse received power value calculated by the average power calculating section 15 and the reference value stored in the reference value storing section 16 in accordance with expression (8) as follows:

[correction value] (dB)=[average reverse received power value]−[reference value] (8)

The control channel message producing section 18 adds the correction value calculated by the correction value calculating section 17 to the default value of either the initial power setting field INIT·PWR or the transmission power setting field NOM·PWR of the access parameter message where the base station 10 has as the station data. That is, the control channel message producing section 18 renews the value (bits) in either the initial power setting field INIT PWR or the transmission power setting field NOM·PWR of the access parameter message. In addition, the control channel message producing section 18 renews the bit stored in the parameter alteration field ACC·MES·SEQ of the access parameter message. The control section 12 transmits the renewed access parameter message to the mobile station 20 through the base modem section 13, the base transmitter 141, the base duplexer 143, and the base antenna 19.

When the mobile station 20 receives the access parameter message from the base station 10, the mobile station 20 confirms whether or not the parameter alteration field ACC·MES·SEQ in the access parameter message is renewed. Although illustration is not made in FIG. 4, the mobile station 20 includes a transmission power setting register for storing the value or bits in the transmission power setting field NOM·PWR, an initial power setting register for the value or bits in the initial power setting field INIT·PWR, and a small transmission power indicating register for storing the field value or bits in the small transmission power indicating field NOM·PWR·EXT. When the parameter alteration field ACC·MES·SEQ in the access parameter message is renewed, the mobile station 20 rewrites the value in the transmission power setting register or the initial power setting register in accordance with the value in the transmission power setting field NOM·PWR or the initial power setting field INIT·PWR in order to perform the open loop control according to IS-95-A standard of TIA/EIA. In addition, the mobile station rewrites the field value in the small transmission power indicating register in accordance with the value in the small transmission power indicating field NOM·PWR·EXT in order to perform the open loop control according to IS-95-B standard of TIA/EIA. In addition, the mobile station 20 determines the transmission power in the open loop control by substituting the values in the transmission power setting register, the initial power setting register, and the small transmission power indicating register into the above-mentioned expressions (1), (4), and (5).

As described above, in a case of determining the transmission power in the open loop control, the mobile station 20 incorporates the field value of the transmission power setting field NOM·PWR or the initial power setting field INIT·PWR transmitted from the base station 10 into the open loop control to change the field value in response to the state of the reverse channel and performs control of the transmission power.

Figure 6:
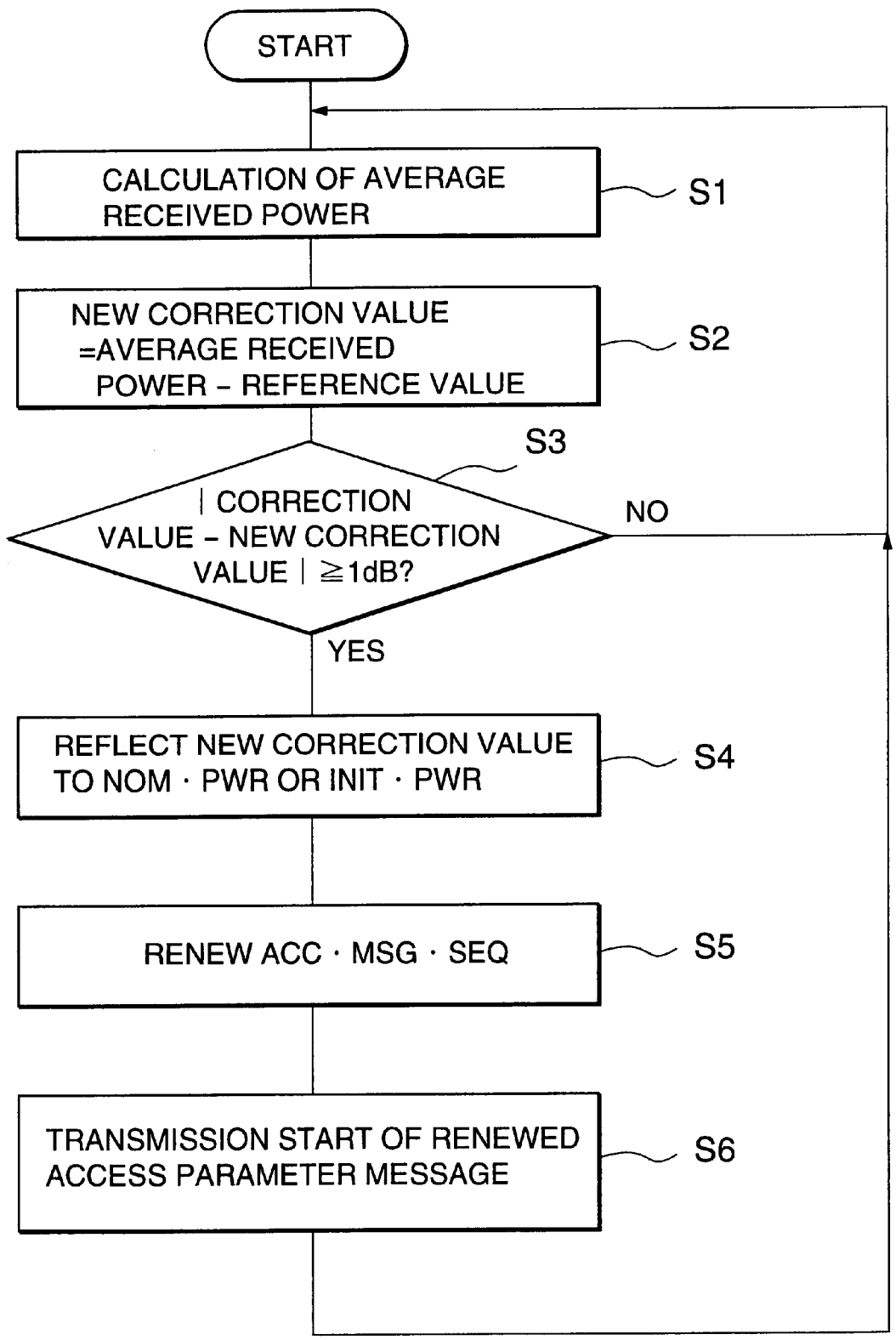
FIG. 6 is a flowchart showing a processing procedure in an open loop control according to the base station illustrated in FIG. 3.

Referring now to FIG. 6 in addition to FIG. 3, the description will proceed to a processing procedure of the open loop control in the base station 10 according to the embodiment of this invention.

When the reverse transmission signal is received in the base receiver 142 as the reverse received signal, the base receiver 142 successively measures the instantaneous reverse received power values of the reverse received signal. The average power calculating section 15 averages the instantaneous reverse received power values for the predetermined time duration to produce the current average received power value at a step S1. The step S1 is followed by a step S2 at which the correction value calculating section 17 subtracts the reference value stored in the reference value storing section 16 from the current average received power value calculated by the average power calculating section 15 to obtain a new correction value as a difference between the current average received power value and the reference value. The step S2 proceeds to a step S3 at which the correction value calculating section 17 determines whether or not a difference between the new correction value and a previous correction value is not less than one dB. When the difference is less than one dB, a processing in the base station 10 turns back from the step S3 to the step S1. When the difference is not less than one dB, the correction value calculating section 17 supplies the new correction value to the control channel message producing section 18 and the step S3 is succeeded by a step S4.

At the step S4, the control channel message producing section 18 adds the new correction value produced by the correction value calculating section 17 to the default value of either the initial power setting field INIT·PWR or the transmission power setting field NOM·PWR where the base station 10 has as the station data. That is, the control channel message producing section 18 renews the value of either the initial power setting field INIT·PWR or the transmission power setting field NOM·PWR of the access parameter message into an added value. The step S4 is followed by a step S5 at which the control channel message producing section 18 renews the value or bit of the parameter alteration field ACC·MES·SEQ of the access parameter message. The control channel message producing section 18 supplies the renewed access parameter message to the control section 12 as the transmission power control information signal and the step S5 proceeds to a step S6. At the step S6, the control section 12 sends the transmission power control information signal to the base modem section 13. The base modem section 13 carries out spreading and modulation on the transmission power control information signal to produce the spread signal which is supplied to the base transmitter 141. The base transmitter 141 transmits the spread signal to the mobile station 20 (FIG. 4) through the base duplexer 143 and the base transmit-receive shared antenna 19 as the forward transmission signal.

Figure 7:
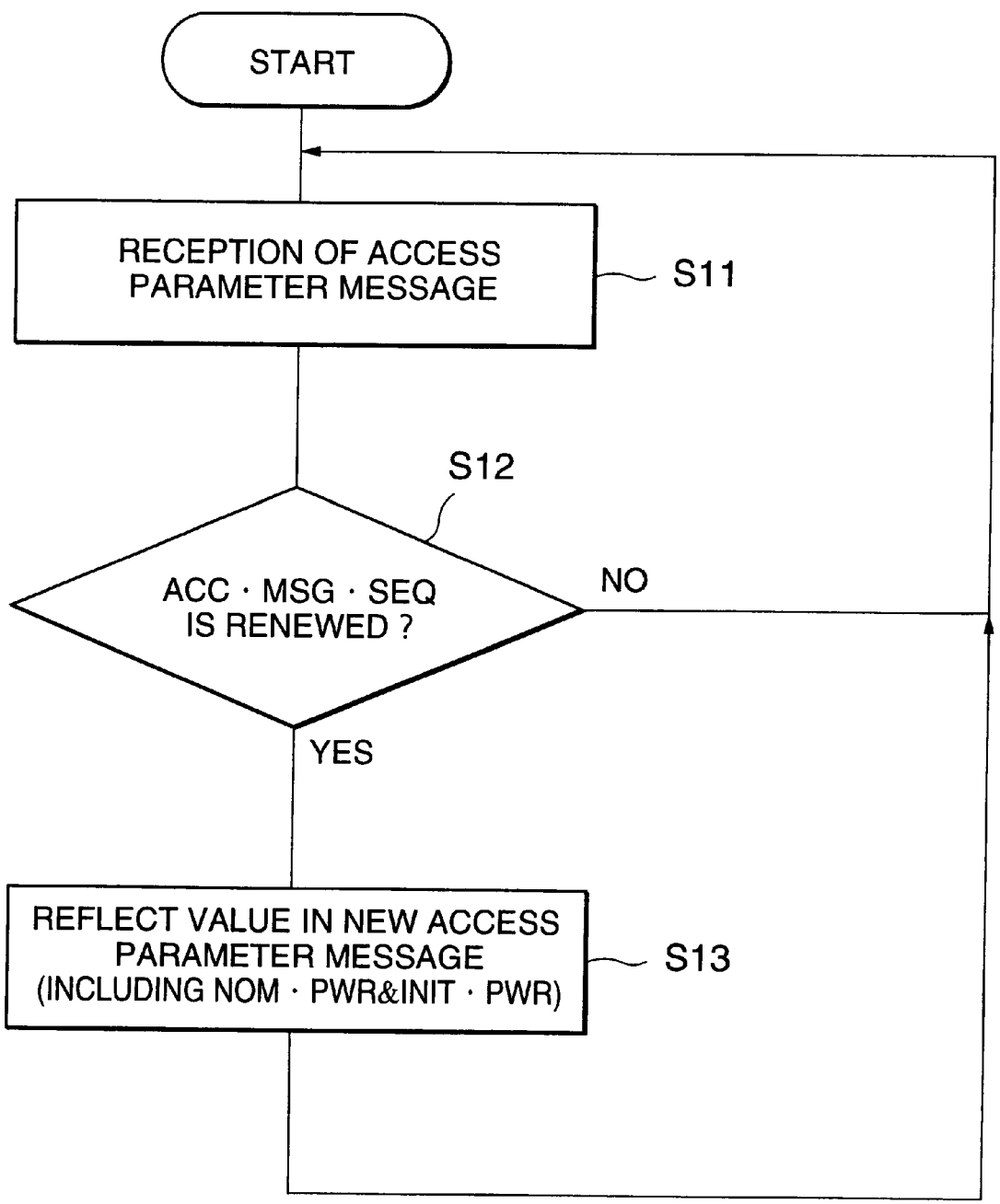
FIG. 7 is a flowchart showing a processing procedure in an open loop control according to the mobile station illustrated in FIG. 4.

Referring now to FIG. 7 in addition to FIG. 4, the description will proceed to a correction processing in the open loop control in the mobile station 20.

In the mobile station 20, the forward transmission signal including the transmission power control information signal (access parameter message) is received in the mobile receiver 23 through the mobile antenna 21 and the mobile duplexer 22 as the forward received signal and the forward received signal is demodulated in the mobile demodulator 26 into the forward received data at a step S1. The forward received data are supplied to the correction information detector 28. The step S11 is succeeded by a step S12 at which the correction information detector 28 determines whether or not the value or bit in the parameter alteration field ACC·MES·SEQ of the access parameter message is renewed. When the value or bit in the parameter alteration field ACC·MES·SEQ of the access parameter message is not renewed, a processing in the mobile station 20 is turned from the step S12 back to the step S11. When the value or bit in the parameter alteration field ACC·MES·SEQ of the access parameter message is renewed, the step S12 is followed by a step S13 at which the correction information detector 28 renews a previous value in either the initial power setting register or the transmission power setting register into the correction value transmitted from the base station 10 (FIG. 3). The correction information detector 28 produces the correction information signal. The adder 25 adds the correction information signal to the received electric field signal supplied from the mobile receiver to produce the open loop control signal which is supplied to the mobile transmitter 24. The mobile transmitter 24 power-amplifies the reverse spread signal with transmission power of the reverse spread signal controlled by the open loop control signal. The mobile transmitter 24 transmits a reverse power-amplified spread signal through the mobile duplexer 22 and the mobile transmit-receive shared antenna 21 as the reverse transmission signal. That is, the mobile station 20 transmits the reverse transmission signal by controlling the transmission power corresponding to the open loop control which the base station 10 carries out.

In the open loop control, the access parameter message transmitted from the base station 10 may have a low transmission rate in comparison with a rate of the open loop control. Accordingly, the access parameter message may be transmitted using a slow access channel (SACCH) in an access channel (ACCH) incidental to the traffic channel (TCH). In addition, the access parameter message may be transmitted using a fast access channel (FACCH) in compliance with structure of system.

As described above, the reverse channel interference correction method in the CDMA open loop control according the embodiment of this invention performs the open loop control to increase the transmission power by using, as the reference value, the average received power in the base station 10 in a case where there is no communicating mobile station and there is no interference wave from other mobile stations and by transmitting, from the base station 10 to the mobile station 20, as the correction value, the ascending part of the average received power in a case where there is another communicating mobile station or there is any interference wave from the other mobile stations. As a result, it is possible to carry out channel connection stably and certainly and to improve the system connectivity.

While this invention has thus far been described in conjunction with a preferred embodiment thereof, it will now be readily possible for those skilled in the art to put this invention into various other manners.

What is claimed is:

1. A method of compensating for reverse channel interference in a code division multiple access (CDMA) open loop control on the basis of received reverse channel interference power to control transmission power of a mobile station, wherein said method comprising the steps of:

measuring, in a base station, a plurality of received interference powers of a reverse channel at respective times to produce measured received power values;

calculating, in said base station, an average of the measured received power values to produce a calculated average value indicative of the average reverse channel interference power;

calculating, in said base station, on the basis of the calculated average value and a reference value, a correction value for making said mobile station increase a current transmission power so as to become larger than a previous transmission power;

transmitting information indicative of the correction value from said base station to said mobile station;

receiving, in said mobile station, the information comprising the correction value;

determining, in said mobile station, whether the received correction value differs from a current correction value; and setting, in said mobile station, transmission power of said mobile station on the basis of the received correction value if the received correction value differs from the current correction value.

2. A method as claimed in claim 1, wherein the step of transmitting the information of the correction value from said base station to said mobile station comprises the steps of:

adding the correction value to a default value in an initial power setting field of an access parameter message on a paging channel;

renewing a bit in a parameter alteration field of the access parameter message; and transmitting, from said base station to said mobile station, an access parameter message as the information comprising the correction value.

3. A method as claimed in claim 2, wherein said receiving step receives the access parameter message as the information comprising the correction value;

said determining step determining whether the bit in the parameter alteration field is renewed; and said setting step controlling the transmission power of said mobile station by renewing a value in the initial power setting field into the correction value.

4. A method as claimed in claim 1, wherein the step of transmitting the information comprising the correction value from said base station to said mobile station comprises the steps of:

adding the correction value to a default value in a transmission power setting field for a speech channel of an access parameter message on a paging channel;

renewing a bit in a parameter alteration field of the access parameter message; and transmitting, from said base station to said mobile station, the access parameter message as the information comprising the correction value.

5. A method as claimed in claim 4, wherein said receiving step receives the access parameter message as the information comprising the correction value;

said determining step determining whether or not the bit in the parameter alteration field is renewed; and said setting step controlling the transmission power of said mobile station by renewing a value in the transmission power setting field in accordance with the correction value.

6. A method as claimed in claim 1, wherein said reference value is equal to an average received power value in a state where said base station does not receive any transmission signal from other mobile stations.

7. A method as claimed in claim 1, wherein said reference value is equal to an average received power value in a state where said base station does not receive an interference wave.

8. A method as claimed in claim 1, wherein said reference value is equal to an average received power value in a state where said base station does not receive any transmission signal from other mobile stations and said base station does not receive an interference wave.

9. A method as claimed in claim 1, wherein said correction value is obtained by subtracting the reference value from the calculated average value.

10. A code division multiple access (CDMA) open loop control reverse channel interference correcting system for compensating for reverse channel interference on the basis of received reverse channel interference power to control transmission power of a mobile station, wherein said base station comprises:

base receiving means for receiving a reverse channel signal;

measuring means, connected to said base receiving means, for measuring a plurality of received interference powers of the reverse channel at respective times to produce measured received power values;

average received interference power calculating means, connected to said measuring means, for calculating an average of the measured received power values to produce a calculated average value indicative of the average reverse channel interference power;

correction value calculating means, connected to said average received power calculating means, for calculating, on the basis of the calculated average value and a reference value, a correction value for making said mobile station increase a current transmission power so as to become larger than a previous transmission power; and transmitting means, connected to said correction value calculating means, for transmitting information comprising the correction value to said mobile station, said mobile station comprising:

mobile receiving means for receiving the information comprising the correction value;

determining means, connected to said mobile receiving means, for determining whether the received correction value differs from a current correction value; and setting means, connected to said determining means, for setting transmission power on the basis of the received correction value when the received correction value differs from the current correction value.

11. A CDMA open loop control reverse channel interference correcting system as claimed in claim 10, wherein said transmitting means comprises:

control channel message producing means, connected to said correction value calculating means, for storing the information comprising the correction value in an access parameter message on a paging channel;

modulating means, connected to said control channel message producing means, for modulating a carrier signal with the access parameter message to produce a modulated signal; and radio transmitting means, connected to said modulating means, for radio transmitting the modulated signal.

12. A CDMA open loop control reverse channel interference correcting system as claimed in claim 10, wherein said average received power calculating means produces the reference value corresponding to an average received power value in a state where said base station does not receive any transmission signal from other mobile stations.

13. A CDMA open loop control reverse channel interference correcting system as claimed in claim 10, wherein said average received power calculating means produces the reference value corresponding to an average received power value in a state where said base station does not receive an interference wave.

14. A CDMA open loop control reverse channel interference correcting system as claimed in claim 10, wherein said average received power calculating means produces the reference value corresponding to an average received power value in a state where said base station does not receive any transmission signal from other mobile stations and said base station does not receive an interference wave.

15. A CDMA open loop control reverse channel interference correcting system as claimed in claim 10, wherein said correction value calculating means obtains said correction value by subtracting the reference value from the calculated average value.

16. A CDMA open loop control reverse channel interference correcting system as claimed in claim 11, wherein said base station transmits the access parameter message using a slow access channel in an access channel incidental to a traffic channel.

17. A CDMA open loop control reverse channel interference correcting system as claimed in claim 11, wherein said base station transmits the access parameter message using a fast access channel in an access channel incidental to a traffic channel.

18. A base station for use in a code division multiple access (CDMA) open loop control reverse channel interference correcting system for compensating for reverse channel interference on the basis of received reverse channel interference power to control transmission power of a mobile station, wherein said base station comprises:

receiving means for receiving a reverse channel signal;

measuring means, connected to said receiving means, for measuring a plurality of received interference powers of the reverse channel at respective times to produce measured received power values;

average received interference power calculating means, connected to said measuring means, for calculating an average of the measured received power values to produce a calculated average value indicative of the average reverse channel interference power;

correction value calculating means, connected to said average received power calculating means, for calculating, on the basis of the calculated average value and a reference value, a correction value for making said mobile station increase a current transmission power so as to become larger than a previous transmission power; and transmitting means, connected to said correction value calculating means, for transmitting information comprising the correction value to said mobile station.

19. A base station as claimed in claim 18, wherein said transmitting means comprises:

control channel message producing means, connected to said correction value calculating means, for storing the information comprising the correction value in an access parameter message on a paging channel;

modulating means, connected to said control channel message producing means, for modulating a carrier signal with the access parameter message to produce a modulated signal; and radio transmitting means, connected to said modulating means, for radio transmitting the modulated signal.

20. A base station as claimed in claim 18, wherein said average received power calculating means produces the reference value corresponding to an average received power value in a state where said base station does not receive any transmission signal from other mobile stations.

21. A base station as claimed in claim 18, wherein said average received power calculating means produces the reference value corresponding to an average received power value in a state where said base station does not receive an interference wave.

22. A base station as claimed in claim 18, wherein said average received power calculating means produces the reference value corresponding to an average received power value in a state where said base station does not receive any transmission signal from other mobile stations and said base station does not receive an interference wave.

23. A base station as claimed in claim 18, wherein said correction value calculating means obtains said correction value by subtracting the reference value from the calculated average value.

24. A base station as claimed in claim 19, wherein said base station transmits the access parameter message using a slow access channel in an access channel incidental to a traffic channel.

25. A base station as claimed in claim 19, wherein said base station transmits the access parameter message using a fast access channel in an access channel incidental to a traffic channel.

26. A base station for use in a code division multiple access (CDMA) open loop control reverse channel interference correcting system for compensating for reverse channel interference on the basis of received reverse channel interference power to control transmission power of a mobile station, wherein said base station comprises:

a base receiver for receiving a reverse channel signal and for measuring a plurality of received interference powers of the reverse channel at respective times to produce measured received power values;

an average received interference power calculating section, connected to said base receiver, for calculating an average of the measured received power values to produce a calculated average value indicative of reverse channel interference power;

a correction value calculating section, connected to said average power calculating section, for calculating, on the basis of the calculated average value and a reference value, a correction value for making said mobile station increase a current transmission power so as to become larger than a previous transmission power; and a transmitting section, connected to said correction value calculating section, for transmitting information comprising the correction value to said mobile station.

27. A base station as claimed in claim 26, wherein said transmitting section comprises:

a control channel message producing section, connected to said correction value calculating section, for storing the information comprising the correction value in an access parameter message on a paging channel;

a modulating section, connected to said control channel message producing section, for modulating a carrier signal with the access parameter message to produce a modulated signal; and a base transmitter, connected to said modulating section, for radio transmitting the modulated signal.

28. A base station as claimed in claim 26, wherein said average power calculating section produces the reference value corresponding to an average received power value in a state where said base station does not receive any transmission signal from other mobile stations.

29. A base station as claimed in claim 26, wherein said average power calculating section produces the reference value corresponding to an average received power value in a state where said base station does not receive an interference wave.

30. A base station as claimed in claim 26, wherein said average power calculating section produces the reference value corresponding to an average received power value in a state where said base station does not receive any transmission signal from other mobile stations and said base station does not receive an interference wave.

31. A base station as claimed in claim 26, wherein said correction value calculating section obtains said correction value by subtracting the reference value from the calculated average value.

32. A base station as claimed in claim 27, wherein said base station transmits the access parameter message using a slow access channel in an access channel incidental to a traffic channel.

33. A base station as claimed in claim 27, wherein said base station transmits the access parameter message using a fast access channel in an access channel incidental to a traffic channel.

\* \* \* \* \*

UNITED STATES PATENT AND TRADEMARK OFFICE
CERTIFICATE OF CORRECTION

PATENT NO. : 6,580,919 B1
DATED : June 17, 2003
INVENTOR(S) : Atsushi Saito

It is certified that error appears in the above-identified patent and that said Letters Patent is hereby corrected as shown below:

<u>Title page,</u>
Item [30], please correct the Foreign Application Priority Data, to read as
-- Nov. 12, 1998 -- instead of "Dec. 11, 1998".

Signed and Sealed this

Twenty-eighth Day of October, 2003

JAMES E. ROGAN
*Director of the United States Patent and Trademark Office*